United States Patent
Heald

(10) Patent No.: US 9,739,255 B2
(45) Date of Patent: Aug. 22, 2017

(54) SUBMERSIBLE TURBINE GENERATOR

(71) Applicant: Barry G. Heald, Steamboat Springs, CO (US)

(72) Inventor: Barry G. Heald, Steamboat Springs, CO (US)

(*) Notice: Subject to any disclaimer, the term of this patent is extended or adjusted under 35 U.S.C. 154(b) by 0 days.

(21) Appl. No.: 14/934,280

(22) Filed: Nov. 6, 2015

(65) Prior Publication Data
US 2017/0145982 A1    May 25, 2017

(51) Int. Cl.
| F03B 13/10 | (2006.01) |
| F03B 17/06 | (2006.01) |
| F01D 25/32 | (2006.01) |
| F01D 15/10 | (2006.01) |
| F01D 15/12 | (2006.01) |

(52) U.S. Cl.
CPC ............ *F03B 13/10* (2013.01); *F01D 15/10* (2013.01); *F01D 15/12* (2013.01); *F01D 25/32* (2013.01); *F03B 17/061* (2013.01); *F05B 2220/32* (2013.01)

(58) Field of Classification Search
CPC ........ F03B 13/10; F03B 17/061; F01D 15/10; F01D 15/12; F01D 25/32
USPC ................................................ 290/43, 54
See application file for complete search history.

(56) References Cited

U.S. PATENT DOCUMENTS

| 6,652,221 | B1* | 11/2003 | Praenkel | F03B 17/061 415/3.1 |
| 8,911,207 | B1* | 12/2014 | Anderson, Jr. | F03B 13/264 416/142 |
| 2006/0244267 | A1* | 11/2006 | Fraenkel | F03B 13/264 290/54 |
| 2007/0182159 | A1* | 8/2007 | Davis | F03B 11/004 290/54 |
| 2007/0207028 | A1* | 9/2007 | Nicholas | F03B 17/061 415/3.1 |
| 2009/0121487 | A1* | 5/2009 | Fraenkel | F03B 13/142 290/53 |
| 2010/0183377 | A1* | 7/2010 | Fraenkel | E02D 27/52 405/232 |
| 2011/0031753 | A1* | 2/2011 | Moore | F03B 17/063 290/54 |
| 2015/0260152 | A1* | 9/2015 | Dehlsen | F03B 13/264 416/244 B |
| 2015/0337794 | A1* | 11/2015 | Perrenoud | F03B 17/061 416/128 |

(Continued)

*Primary Examiner* — Viet Nguyen

(57) ABSTRACT

A submersible turbine generator unit can be placed in rivers, streams, or anywhere water flows in order to generate electricity without the need for dams. It is designed to work with its own diversion equipment for controlling and directing a flow of water into the turbine blades. The unit can be raised and lowered in the flow to enhance efficiency, respond to changing flow conditions, and for inspection/servicing, etc. The positioning system can use a motorized worm gear and a rack to raise or lower the turbine generator combination. Once raised up, a hard connection point allows attachment of a lifting cable so the turbine/generator combination can be easily removed and replaced as needed. A submersible turbine generator utilizes uniquely shaped turbine blades that efficiently engage flowing water and spin the turbine shaft without presenting undue risk to aquatic life.

20 Claims, 14 Drawing Sheets

(56) References Cited

U.S. PATENT DOCUMENTS

2016/0160835 A1* 6/2016 Abu-Al-Rubb ......... F03B 13/00
                                                       416/85
2017/0016125 A1* 1/2017 Leonard .................... C25B 1/06

* cited by examiner

SUBMERSIBLE TURBINE GENERATOR

TECHNICAL FIELD

The present invention relates generally to the field of hydropower; more specifically, to the field of hydropower turbines and generators; and more particularly still, to a submersible turbine generator.

BACKGROUND

Hydropower has been utilized for thousands of years. Early hydropower projects captured energy from the motion of falling or flowing water and used that energy to power mechanical devices such as flour mills, sawmills, etc. However, once electricity began to be transmitted as a public utility, mechanical hydropower was quickly supplanted by electrical hydropower. In typical installations, large damns are used to impound water which is then directed through turbines to spin generators and produce electricity on a large scale. However, damn-building can create a number of environmental issues. Additionally, some rivers are in locations where building a damn is not feasible. And of course large damns and electrical generation facilities require large capital outlays before any electricity can be generated and sold.

What is needed is an in-stream turbine generator that can generate electricity from flowing water without building a damn or otherwise adversely impacting the environment. An in-stream submersible turbine generator should be easily placed and removed and have a simple, built-in means for raising and lowering the equipment from the flow to perform maintenance, inspection, etc. Furthermore, the submersible turbine generator blades should be shaped so as to utilize the flow efficiently without presenting undue risk to aquatic life.

SUMMARY

A submersible turbine generator unit is designed to work with its own diversion equipment for controlling and directing a flow of water into the turbine blades. The unit can be raised and lowered in the flow to enhance efficiency, respond to changing flow conditions, and for inspection/servicing, etc. The positioning system can use a motorized worm gear and a rack to raise or lower the turbine generator combination. Once raised up, a hard connection point allows attachment of a lifting cable (like that on a crane, for example) so the entire turbine generator combination can be easily removed and replaced as needed. A submersible turbine generator utilizes uniquely shaped turbine blades that efficiently engage flowing water and spin the turbine shaft without presenting undue risk to aquatic life.

DETAILED DESCRIPTION

Figure 1:
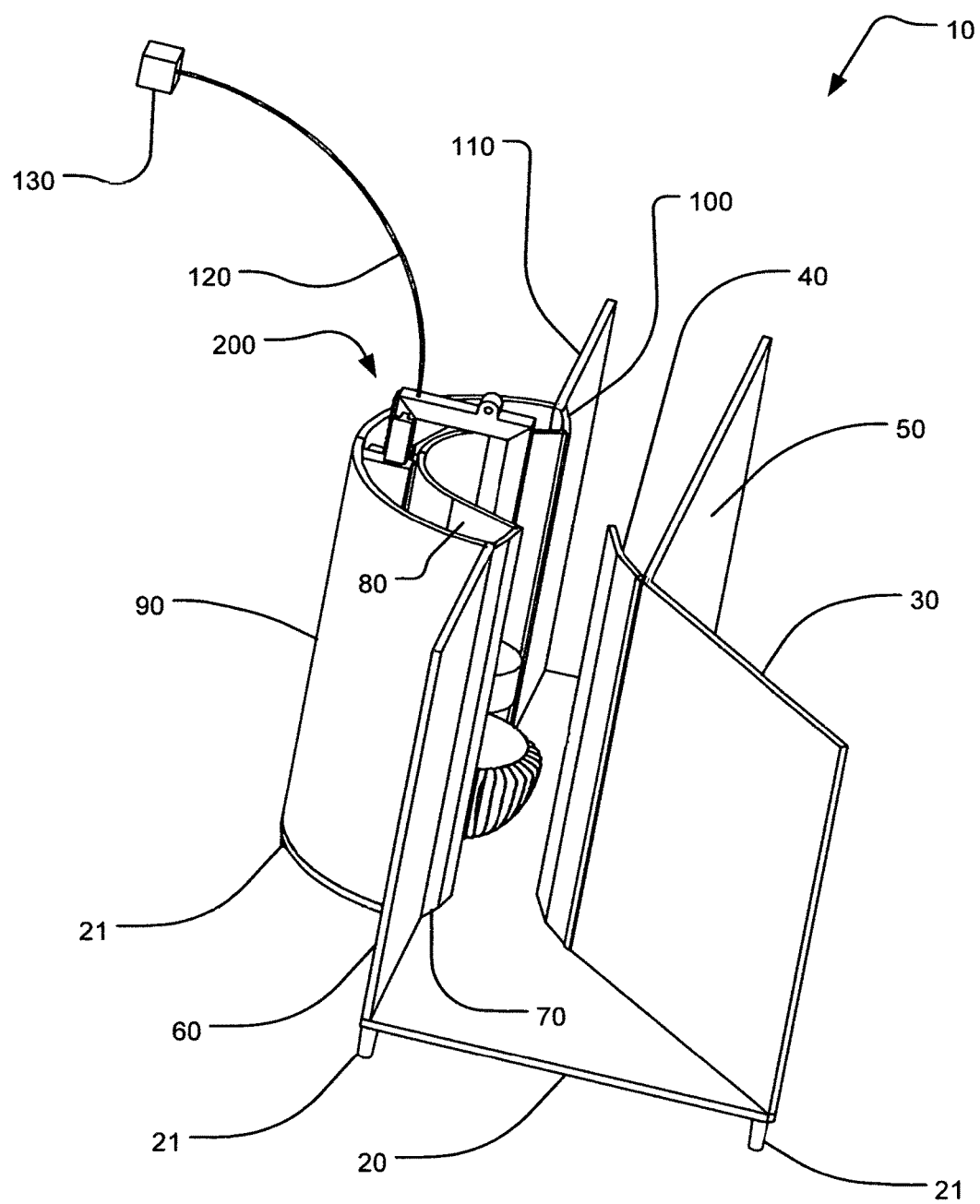
FIG. 1 illustrates a perspective front view of an exemplary embodiment of a submersible turbine generator.

In the following discussion, numerous specific details are set forth to provide a thorough understanding of the present disclosure. However, those skilled in the art will appreciate that embodiments may be practiced without such specific details. Furthermore, lists and/or examples are often provided and should be interpreted as exemplary only and in no way limiting embodiments to only those examples. Similarly, in this disclosure, language such as "could, should, may, might, must, have to, can, would, need to, is, is not", etc. and all such similar language shall be considered interchangeable whenever possible such that the scope of the invention is not unduly limited. For example, a comment such as: "item X is used" can be interpreted to read "item X can be used".

Exemplary embodiments are described below in the accompanying Figures. The following detailed description provides a comprehensive review of the drawing Figures in order to provide a thorough understanding of, and an enabling description for, these embodiments. One having ordinary skill in the art will understand that in some cases well-known structures and functions have not been shown or described in detail to avoid unnecessarily obscuring the description of the embodiments.

Referring now to the drawings, FIG. 1 illustrates a perspective front view of an exemplary embodiment of a submersible turbine generator unit 10. The unit 10 can have a debris guard base 20 which forms a stable structure upon which the remainder of the unit rests. Also, the debris guard base 20 can provide a barrier between the spinning turbine blades and any debris below the unit 10 once it is in place in the water flow. The debris guard base 20 can have a plurality of stand off posts 21 which can engage a bottom surface, river bed, etc. and help keep the unit 10 from moving or sliding once in place. The stand off posts 21 can also be used to ensure that the unit 10 does not become mired or enmeshed on the bottom as water can continue to flow between the unit 10 and the bottom surface, if desired.

Rising up from the debris guard base 20 can be an up flow diversion wall 30. By diverting the flow of water towards the turbine, the up flow diversion wall 30 can enhance the output of the unit 10. In one embodiment, the up flow diversion wall 30 can be adjustable so that any diversion of the flow can be enhanced or diminished or otherwise controlled as desired. Extending from the up flow diversion wall 30 can be a first flow regulator wall 40 which allows fine control of the flow to the turbine. Extending down flow can be a down flow diversion wall 50 that, in some embodiments, can be placed and/or manipulated to enhance flow characteristics as desired.

Up flow from the turbine can be a turbine flow wall 60 rising up from the debris guard base 20. The turbine flow wall 60 helps to ensure the flow is properly channeled to the turbine. Extending from the turbine flow wall 60 can be a second flow regulator wall 70 which allows fine control of the flow to the turbine. A second flow regulator wall 70 can also ensure that water is diverted away from the turbine repositioning system 200 and associated components. The structural wall 90 surrounds the turbine repositioning system 200, protecting it and providing mounting locations to secure components thereof in place. The structural wall 90 can be a partial cylinder or tube (round, square, or other in cross section) and can attach to the debris guard base 20. In a stream or river emplacement situation, the structural wall 90 can be positioned near the stream or river bank so that the turbine repositioning system 200 can be accessed more easily, when needed.

The turbine repositioning system 200 can be mechanically linked via a U support bar (see U support bar 240, 244 and 248 in FIG. 2) to the generator and turbine.

In some embodiments, a turbine containment wall 80 can be utilized to separate the turbine and flow from the turbine repositioning system 200. As shown in FIG. 1, one possible embodiment of a turbine containment wall 80 forms a cylindrical barrier between the flow and the system 200.

In the embodiment in FIG. 1, a third flow regulator wall 100 is utilized. In other embodiments such a wall may be fixed in place, may not be present or may be otherwise configured. In yet other embodiments, a third flow regulator wall 100 can be adjustable. The third flow regulator wall 100 can be attached, or in proximity, to the turbine containment wall 80, a structural wall 90, and/or a down flow turbine wall 110. In the embodiment in FIG. 1, a down flow turbine wall 110 can attach to either, both, or neither of a structural wall 90 and a third flow regulator wall 100. The down flow turbine wall 110 can be fixed in one embodiment, in another, it can be repositionable as needed to help control the flow.

Extending from the top of the unit 10 in FIG. 1 is a power transfer cable 120. Such a cable draws power generated by the unit 10 and feeds it into a power network via a junction box 130. The cable 120 can also receive power from a network and transfer to the unit 10. In yet another embodiment, the cable 120 can transfer data to/from the unit 10 (such as load, capacity, production, condition, maintenance, efficiency, speed, flow measurements, etc.).

The submersible turbine generator unit 10 is designed to work with its own diversion equipment for controlling and directing a flow of water into the turbine blades. The unit can be raised and lowered in the flow via the turbine repositioning system 200 to enhance efficiency, respond to changing flow conditions, and for inspection/servicing, etc.

Figure 2:
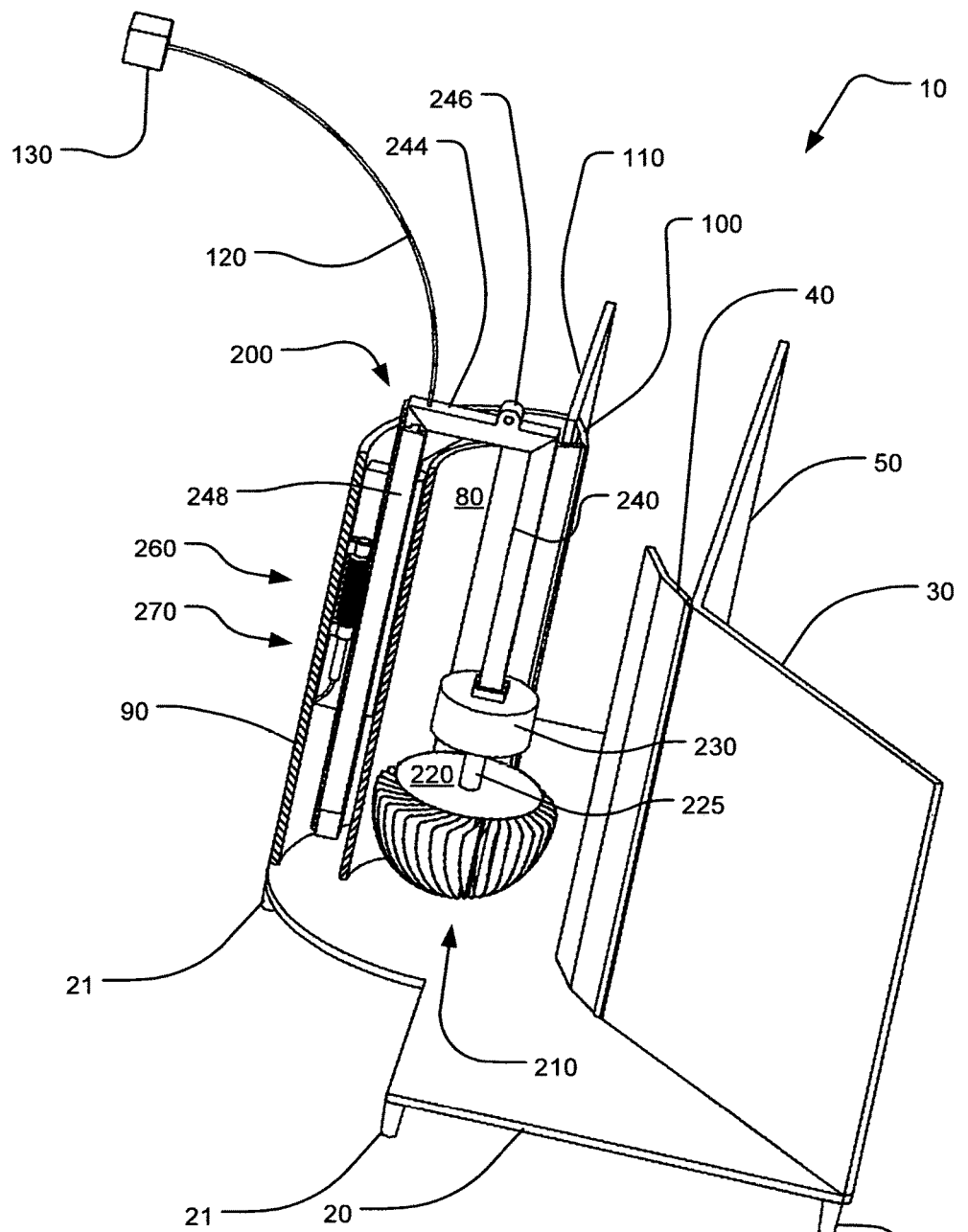
FIG. 2 illustrates a perspective front view of an exemplary embodiment of a submersible turbine generator with some of the diversion and containment walls removed.

FIG. 2 illustrates a perspective front view of an exemplary embodiment of a submersible turbine generator 10 with some of the diversion and containment walls removed so that the turbine 210, generator 230, and other components are more easily viewed. The turbine 210 comprises a plurality of submersible turbine generator blades 205 (see FIG. 9 turbine blade 205). The exact number of turbine blades 205 that comprise the plurality can vary from one to one hundred or more, depending on the needs of the particular unit 10. The turbine 210 can be capped by a turbine plate 220 that contains and protects the plurality of turbine blades 205.

Extending from the turbine 210 is the turbine axis 225 which connects the turbine 210 to the generator 230. The turbine axis 225 transfers the motion of the turbine to the generator 230 where that motion is turned into power. The generator can be any appropriate type of generator, but should be sealed and waterproof as it may need to be deeply submerged in some embodiments. In other embodiments, the generator 230 is placed highly enough relative to the turbine that it does not need to submerged.

The generator can be attached to a suspension member 240. The suspension member 240 positions the turbine 210 in the flow and connects the turbine to the turbine repositioning system 200. The suspension member 240 attaches to a distal end of a cross bar 244 and a drop bar 248 attaches to a proximal end of the cross bar 244. The drop bar 248 can be positioned so that the turbine repositioning system 200 can act upon it in order to raise, lower, and/or otherwise reposition the turbine 210. The length of the cross bar influences how far from the turbine repositioning system 200 the suspension member 240 (and hence the turbine 210) can be placed from the turbine repositioning system 200. Together, the combination of the drop bar 248, cross bar 244, and suspension member 240 comprise a U support bar that can suspend the turbine out over the turbine containment wall 80 and into the flow.

The turbine repositioning system 200 can interact with the drop bar 248 in various ways in order to reposition the turbine. As shown in FIG. 2, the embodiment utilizes a turbine repositioning system 200 comprising a motor 270 and a connection 260. In one embodiment of the turbine repositioning system 200, a motor 270 drives a connection 260 that engages the drop bar 248. In this embodiment, since at least one of the motor and connection is attached directly or indirectly to the structural wall 90, the turbine repositioning system 200 is attached to the structural wall 90 and can act upon the drop bar 248 to reposition the turbine 210. In another embodiment, the turbine repositioning system 200 is fixed in relation to one of the debris guard base 20, the turbine containment wall 80, and the structural wall 90.

In FIG. 2, a portion of the turbine containment wall 80 and the structural wall 90 have been removed in order to more clearly view the turbine 210 and repositioning system 200. Both walls 80 and 90 have a cross-hatching cut-away portion to indicate a cross section has been taken.

Also highlighted in FIG. 2 is a hard connection point 246. The connection point 246 provides a location for attachment of a lifting cable (like that on a crane, for example) so the entire turbine generator combination can be easily removed and replaced as needed.

Figure 3:
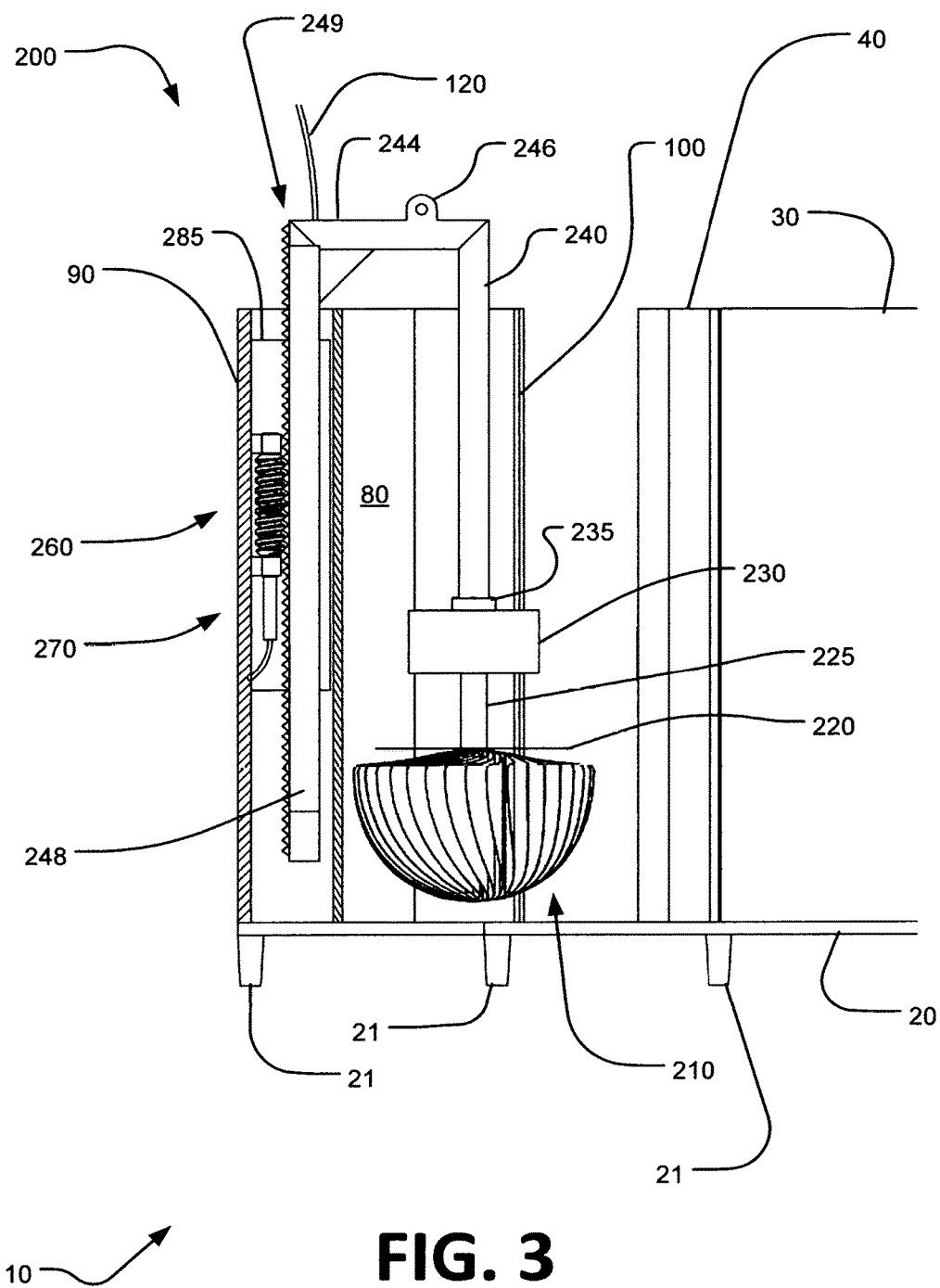
FIG. 3 illustrates a front elevation view of an exemplary embodiment of a submersible turbine generator with some of the diversion and containment walls removed.

FIG. 3 illustrates a front elevation view of an exemplary embodiment of a submersible turbine generator 10 with some of the diversion and containment walls removed. In this embodiment, a vertical displacement linear bar rack 249 is affixed to the U support bar 240, 244 and 248 and engages the connection 260 which comprises a worm gear. As the motor 270 turns the connection's worm gear, the gear engages the rack 249 and forces the U support bar 240, 244, and 248 up or down depending on which direction the worm gear turns. This up or down motion causes the turbine 210 to similarly move up or down.

A first T track 285 is illustrated in FIG. 3. The first T track 285 works in combination with the first T travel bar 295 to guide the drop bar 248 in its up and down vertical travels.

A similar pair of components can be added to the other side of the drop bar 248 (see second T track 280 and second T travel bar 290 in FIG. 4) to further ensure the drop bar 248 travels securely in place.

Figure 4:
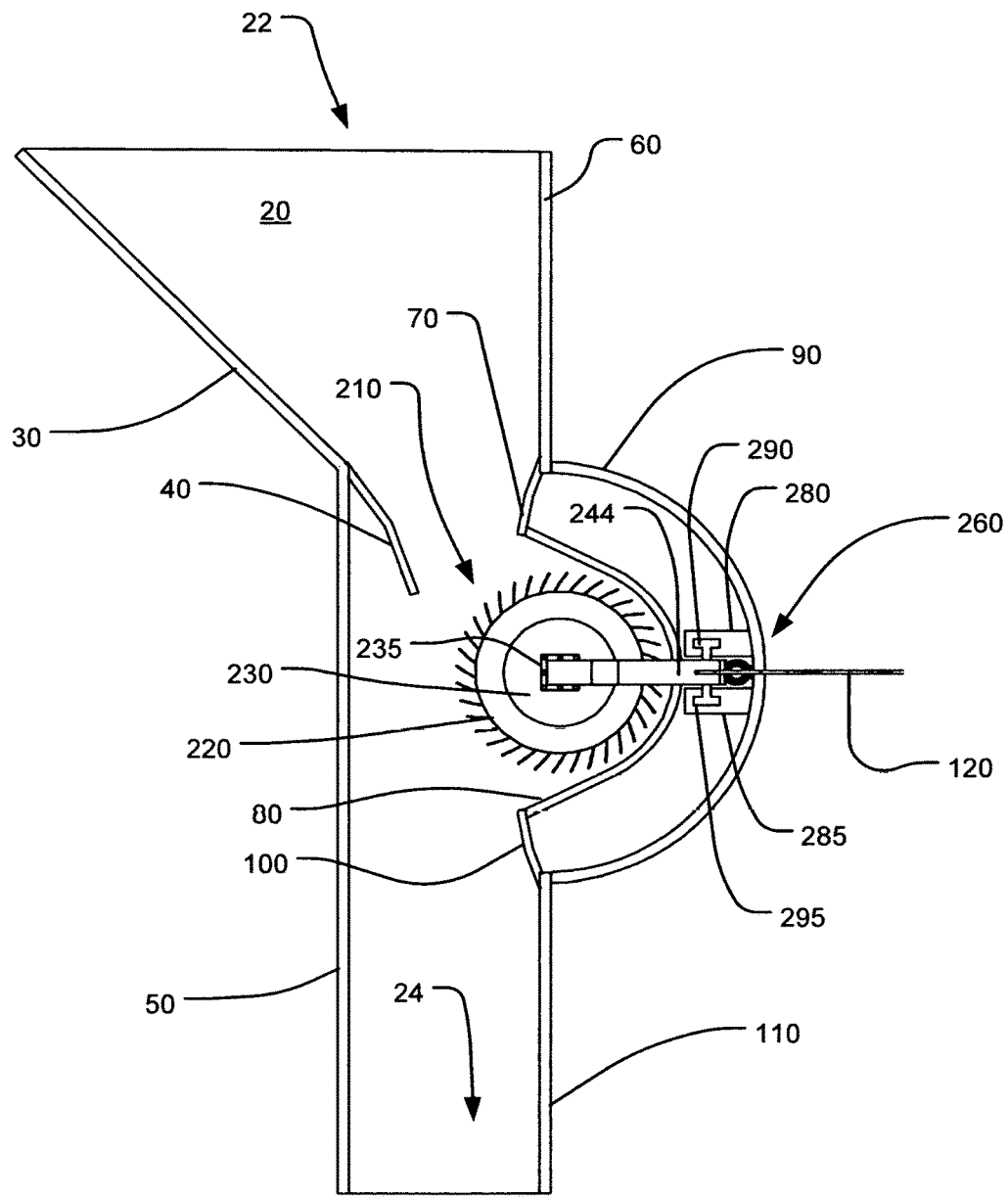
FIG. 4 illustrates a top plan view of an exemplary embodiment of a submersible turbine generator.

FIG. 4 illustrates a top plan view of an exemplary embodiment of a submersible turbine generator 10. In this embodiment the dual T tracks 280 and 285 and dual T travel bars 290 and 295 are shown from above with the T travel bars fitting inside the T tracks and able to slide up and down within the T tracks. Although not shown, bearings, rollers, or other friction reduction devices can be employed.

FIG. 4 also introduces two general area references. The first is the input port 22 of the unit. This is the portion of the unit in which a flow of water (or other material) is directed. The flow is then diverted and directed through the unit 10, passing over/through the turbine 210 and causing it to spin. The spinning turbine drives the generator 230, causing power to be produced. In the case of electrical power, it can be easily transmitted through the power transfer cable 120 and out to a network. The second area reference is the output port 24 of the unit. This is the portion of the unit out which the flow of water (or other material) is directed.

Figure 5:
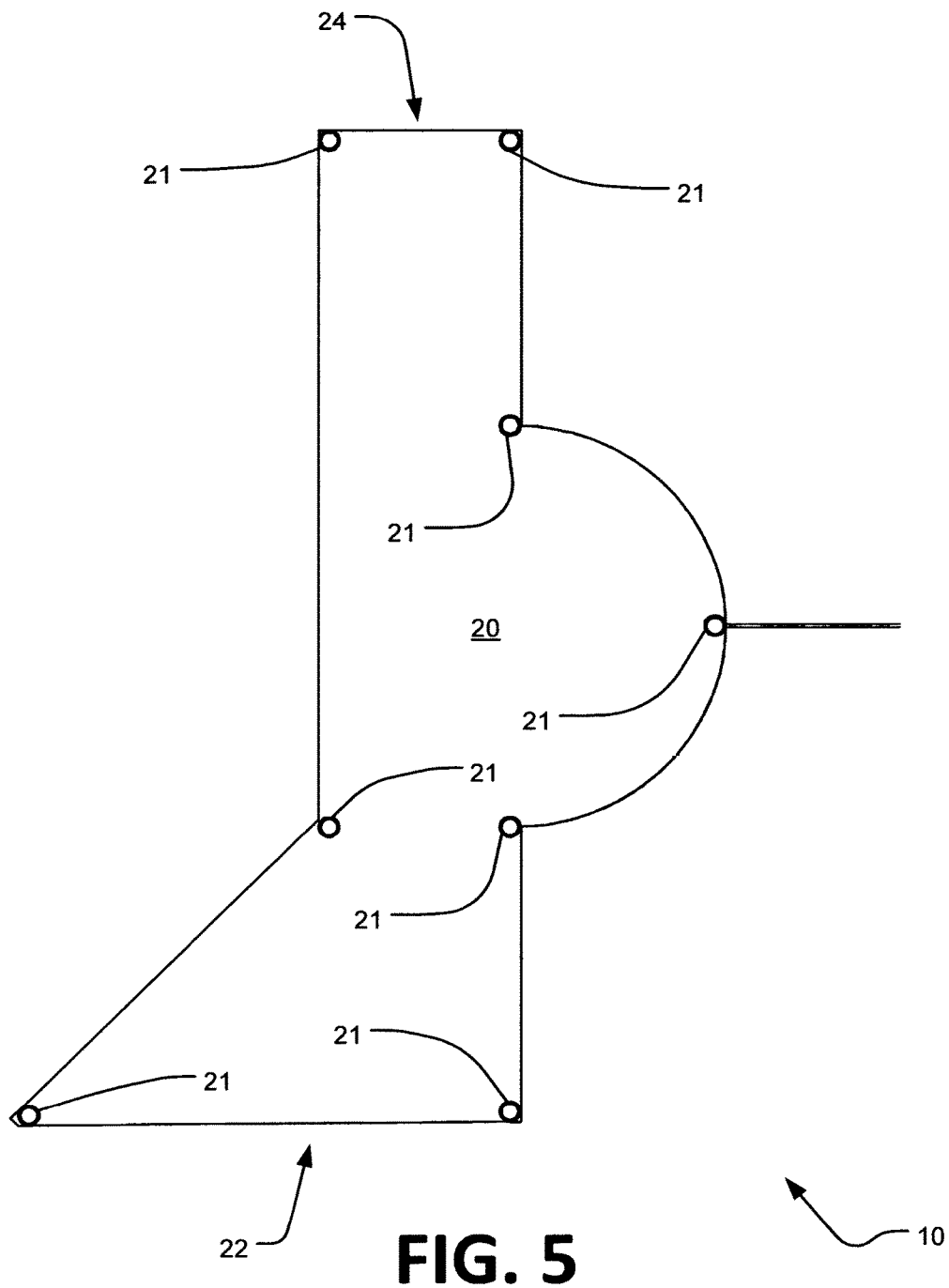
FIG. 5 illustrates a bottom plan view of an exemplary embodiment of a submersible turbine generator.

FIG. 5 illustrates a bottom plan view of an exemplary embodiment of a submersible turbine generator. In this embodiment, the bottom surface of the debris guard base 20 is illustrated. A plurality of stand off posts 21 are shown, in other embodiments, the number of stand off posts 21 can be fewer or greater than that shown in FIG. 5.

Figure 6:
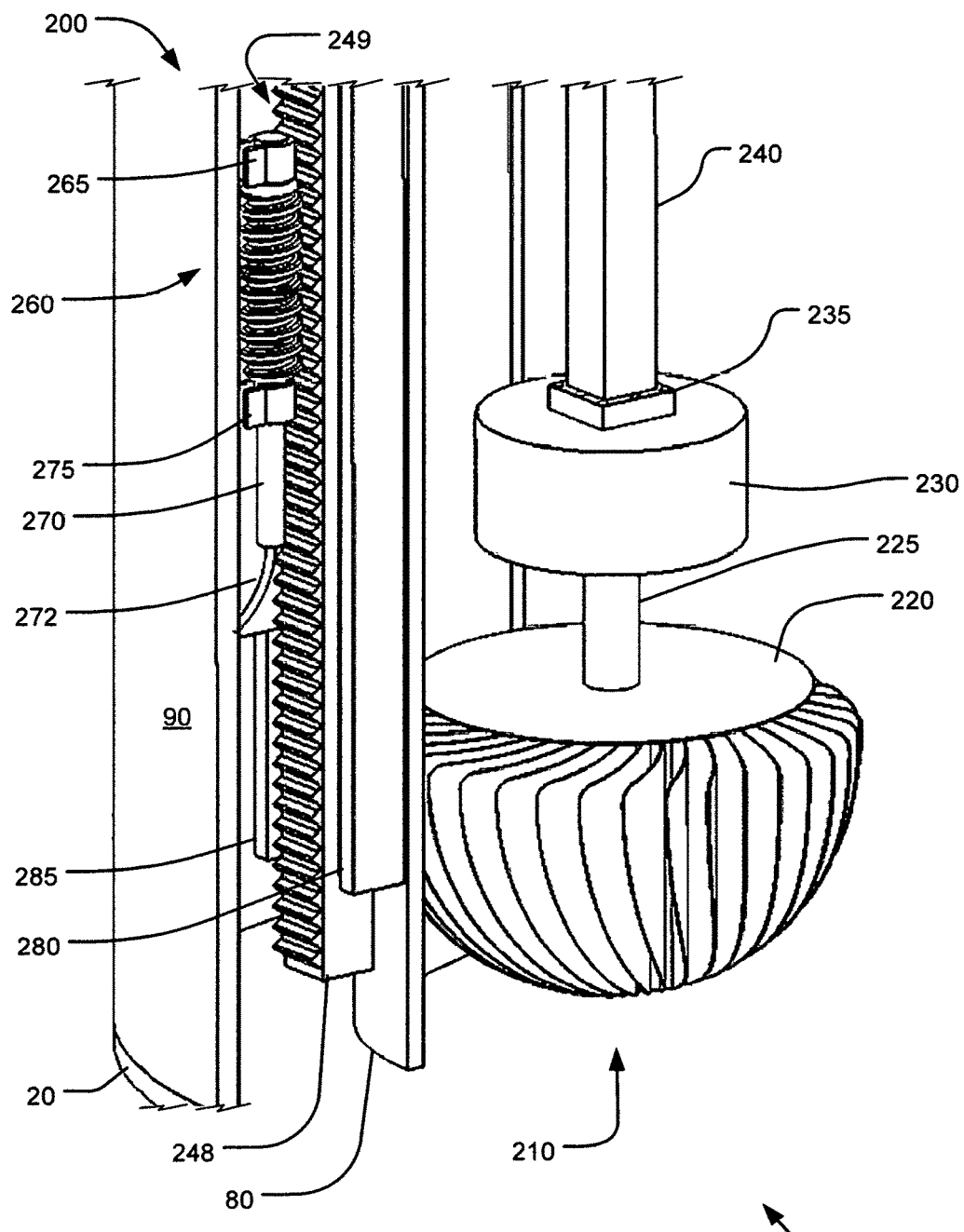
FIG. 6 illustrates a close-up perspective view of a submersible turbine generator highlighting the turbine, generator, and positioning system.

FIG. 6 illustrates a close-up perspective view of a submersible turbine generator 10 highlighting the turbine 210, generator 230, and positioning system 200. In this view, the generator 230 is attached (either removably or fixedly) to a suspension member 240. The distance between the generator 230 and the turbine 210 can be less than or greater than that shown in this Figure in other embodiments.

In this embodiment, both a first T track 285 and a second T track 280 are illustrated. FIG. 6 illustrates them as being attached to the turbine containment wall 80 on either side of the drop bar 248 in order to help guide the drop bar and keep it in position horizontally as it is repositioned vertically by the turbine repositioning system 200. In other embodiments, the T tracks 285 and 280 can be attached to the structural wall 90 and/or the debris guard base 20 in addition to or instead of attachment to the containment wall 80. In yet another embodiment, the T tracks are not attached to any of the three, or are not used whatsoever and a different means of containing and guiding the drop bar 248 is used instead. For example, a single T track and T travel bar could be used on the side of the drop bar 248 opposite the vertical displacement linear bar rack 249.

FIG. 6 shows the motor 270 being attached by the motor clamp 275 to the structural wall 90. In other embodiments, the motor 270 could attach to the system in other ways. Similarly, the connection 260 is illustrated as attaching to the structural wall 90 via the connection clamp 265; but in other embodiments, other means could be used.

The motor 270 is illustrated in FIG. 6 as having an input power source 272. This could be powered by the generator itself when running. However, as the turbine repositioning system 200 often needs to operate when the unit is not running, external power should be made available to the motor from the power transfer cable 120.

Figure 7:
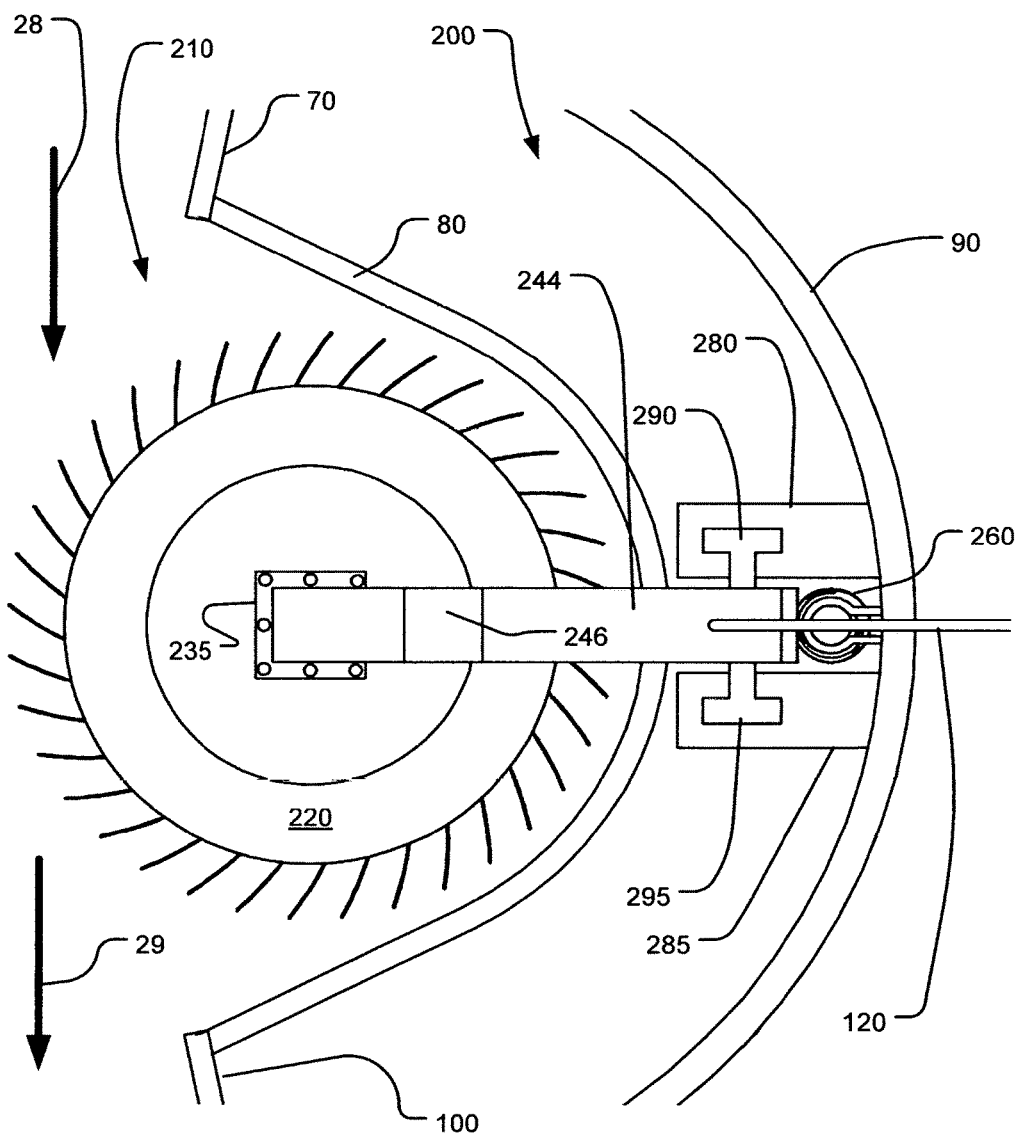
FIG. 7 illustrates a close-up top plan view of a submersible turbine generator highlighting the turbine and positioning system.

FIG. 7 illustrates a close-up top plan view of a submersible turbine generator 10 highlighting the turbine 210 and positioning system 200. In this illustration, the incoming flow 28 is shown as is the outgoing flow 29. As the flow impacts the turbine 210 blades, the turbine spins (in this case, counterclockwise), driving the generator and producing power. Note the close-up view of the T tracks 285 and 280 and the T travel bars 295 and 290 provided by FIG. 7.

Figure 8:
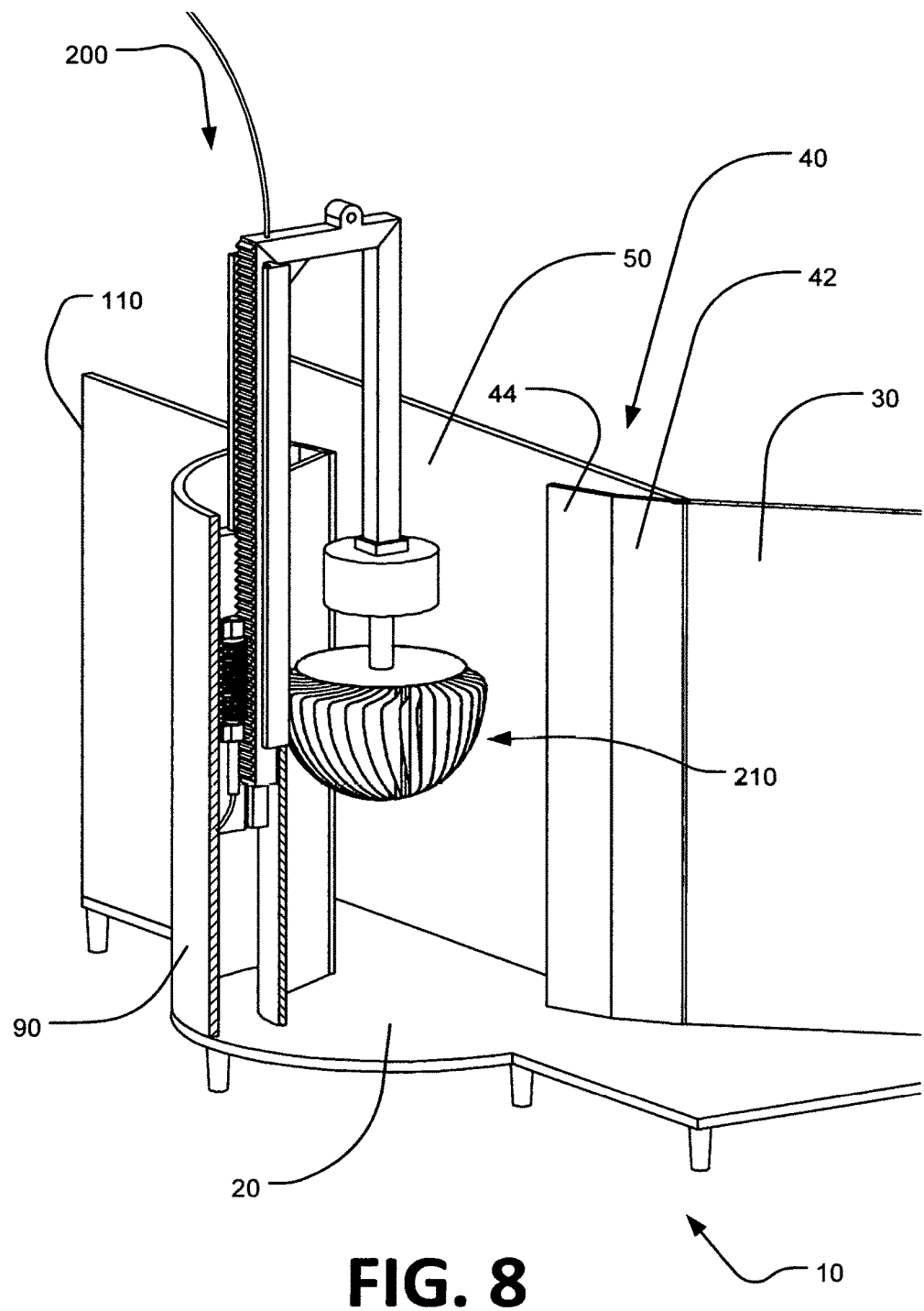
FIG. 8 illustrates a side perspective view of an exemplary embodiment of a submersible turbine generator in a raised configuration with some of the diversion and containment walls removed.

FIG. 8 illustrates a side perspective view of an exemplary embodiment of a submersible turbine generator 10 in a raised configuration with some of the diversion and containment walls removed. Compare the location of the turbine 210 in FIG. 8 with that of the turbine 210 in FIG. 3, relative to the debris guard base 20. It should be readily apparent that FIG. 8 illustrates a unit 10 wherein the turbine repositioning system 200 has been actuated to lift the turbine 210 out of the flow (or at least upwards from its position in FIG. 3). The U support arm, generator, and turbine are ready to be lifted from the unit 10 for maintenance, replacement, etc.

Figure 9:
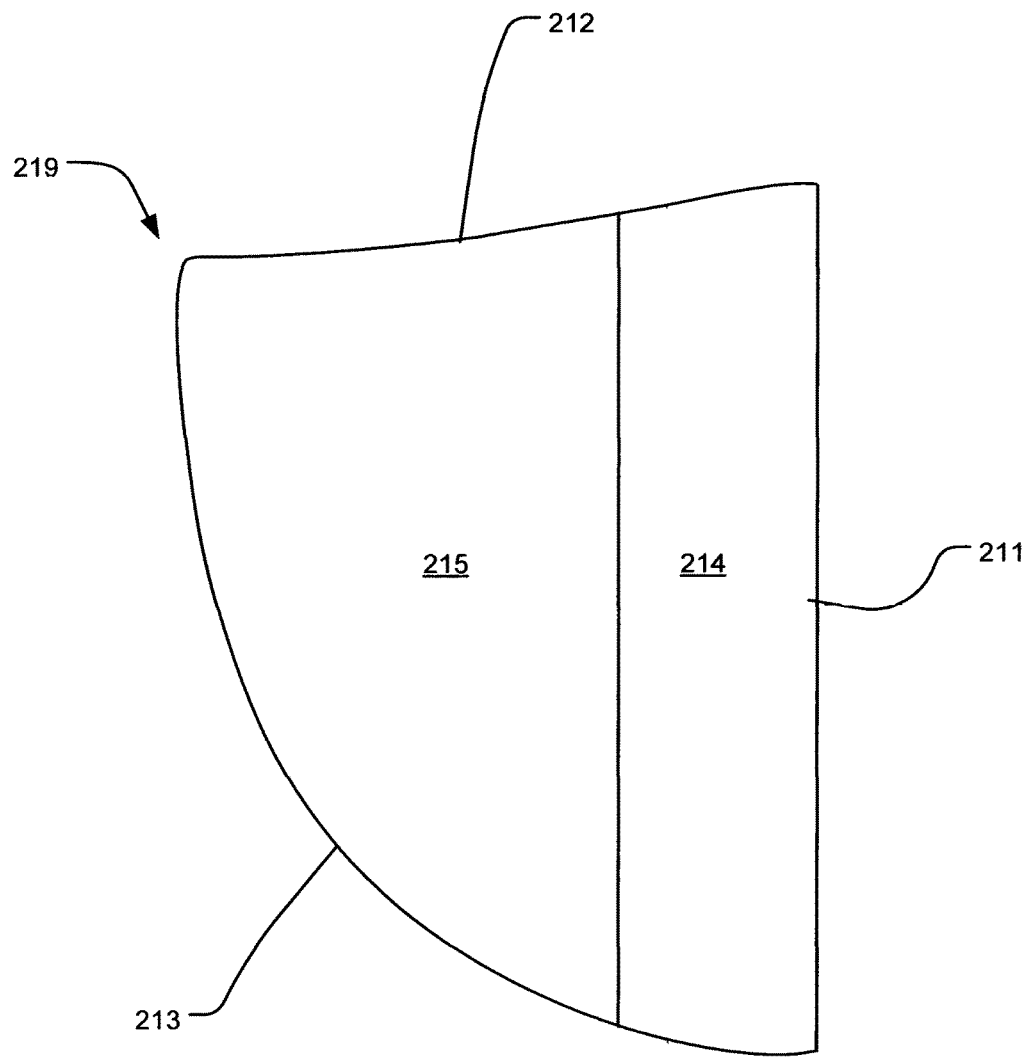
FIG. 9 illustrates a front elevation view of an exemplary embodiment of a submersible turbine generator blade.

FIG. 9 illustrates a front elevation view of an exemplary embodiment of a submersible turbine generator blade 205. This is a single blade of the plurality of turbine blades that can comprise the turbine 210. The submersible turbine generator blade 205 comprises a connection edge 211, a leading bull-nose diversion 214, a trailing scoop 215, a terminating edge 212, a wing edge 213 and a wing tip 219. The connection edge 211 functions to attach the submersible turbine generator blade 205 to a turbine axis 225 and/or to other blades in the turbine. Extending from the connection edge 211 is a large cupped portion called the leading bull-nose diversion 214 that gradually extends forwards of the connection edge 211 before sweeping back away from the connection edge where it attaches to the trailing scoop 215. The leading bull-nose diversion 214 functions to push forward into whatever material makes up the flow (often water) if any residual amount thereof is retained in the spaces between the plurality of turbine blades. The curved shape (see FIG. 10 for a top view) of the diversion 214 functions to direct the flow material back along the blade 205 and ease the movement of the blade to increase the efficiency of the turbine. The trailing scoop 215 continues the gradual back-curving shape of the diversion 214, eventually sweeping well back from the relative position of the connection edge 211 (again, see FIG. 10 for more detail). The trailing scoop 215 has a rounded front face to continue to direct the flow material back along the blade.

The bottom edge of the diversion 214 and trailing scoop 215, referred to as the wing edge 213, flares upwards to the wing tip 219. The wing edge 213 can be shaped so as to minimize turbulence as the flow spins the turbine and flow material in front of the blade rejoins material from behind the blade. Similarly, the wing tip 219, at the terminus of the wing edge 213 can be shaped so as to minimize turbulence and increase the efficiency of the turbine. The terminating edge 212 sweeps down from the top of the connecting edge 211 to join the wing edge 213 and form the wing tip 219.

Figure 10:
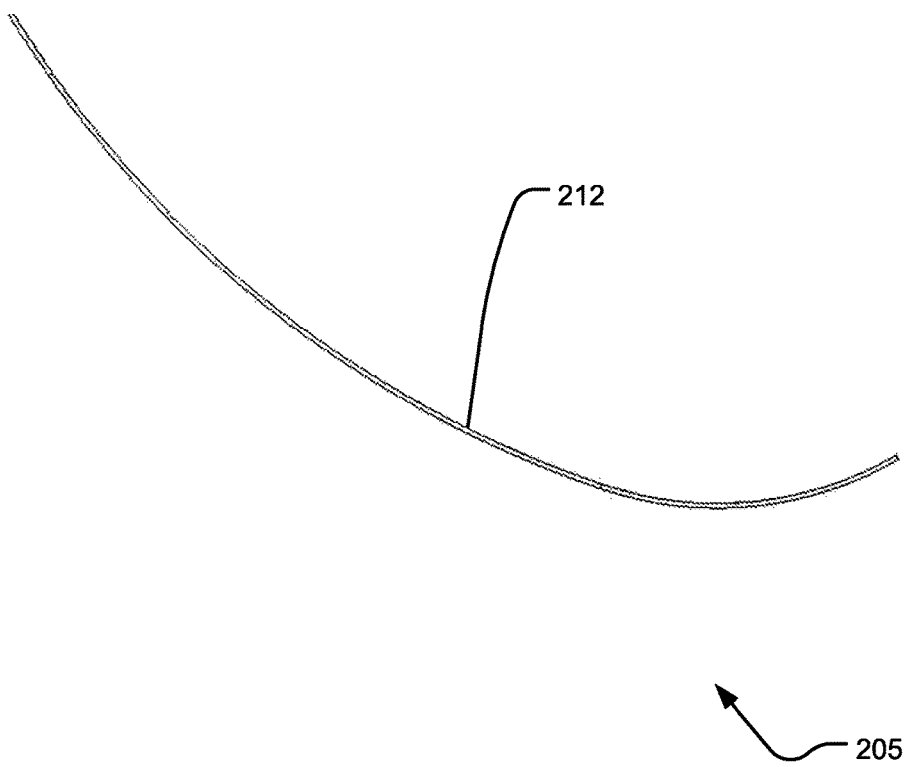
FIG. 10 illustrates a top plan view of an exemplary embodiment of a submersible turbine generator blade.

FIG. 10 illustrates a top plan view of an exemplary embodiment of a submersible turbine generator blade 205. The terminating edge 212 is visible in this illustration. Additionally, the general shape and curves of the components of the blade 205 are visible from this view. For example, the curved, somewhat cupped shape of the leading bull-nose diversion 214 that gradually extends forwards of the connection edge 211 before sweeping back away from the connection edge before attaching to the trailing scoop 215 can be seen in this view. Similarly, the trailing scoop 215 continues the gradual back-curving shape of the diversion 214, eventually sweeping well back from the relative position of the connection edge 211. It is also apparent that the back surface of the blade is somewhat cupped overall so that the flow can better catch the blade and cause it to spin the turbine.

Figure 11:
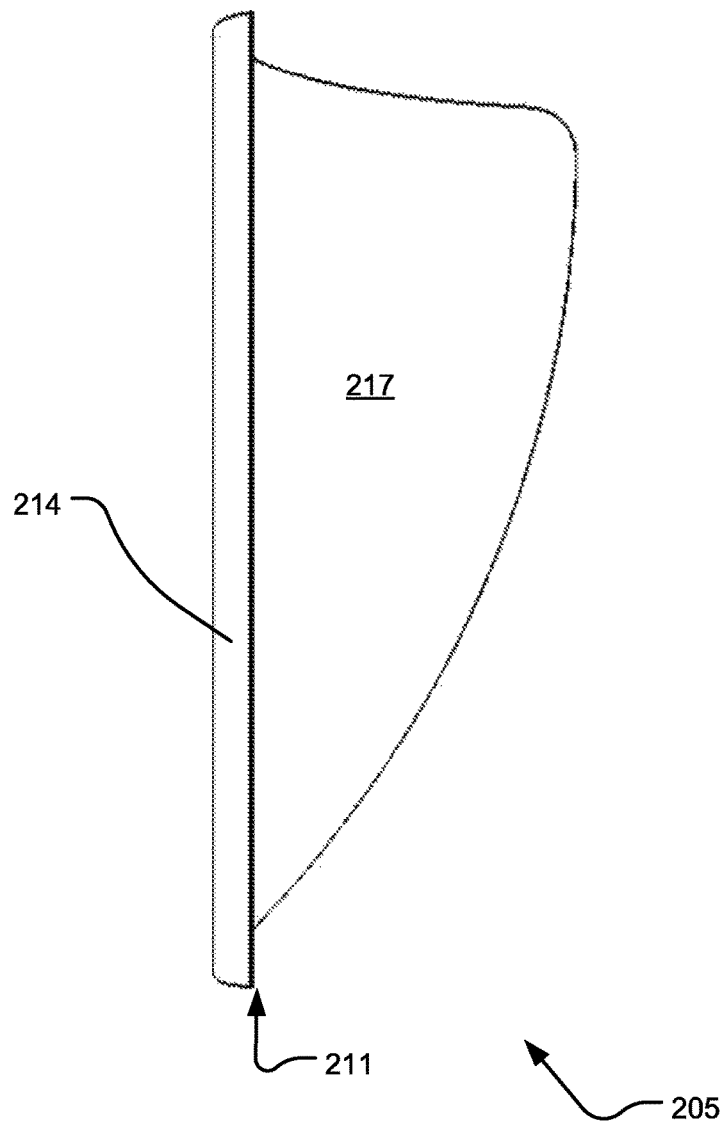
FIG. 11 illustrates a left side elevation view of an exemplary embodiment of a submersible turbine generator blade.

FIG. 11 illustrates a left side elevation view of an exemplary embodiment of a submersible turbine generator blade 205. The leading bull-nose diversion 214 clearly extends forwards from the connection edge 211 before curving back beyond the connection edge and forming the back of the blade or trailing surface 217.

Figure 12:
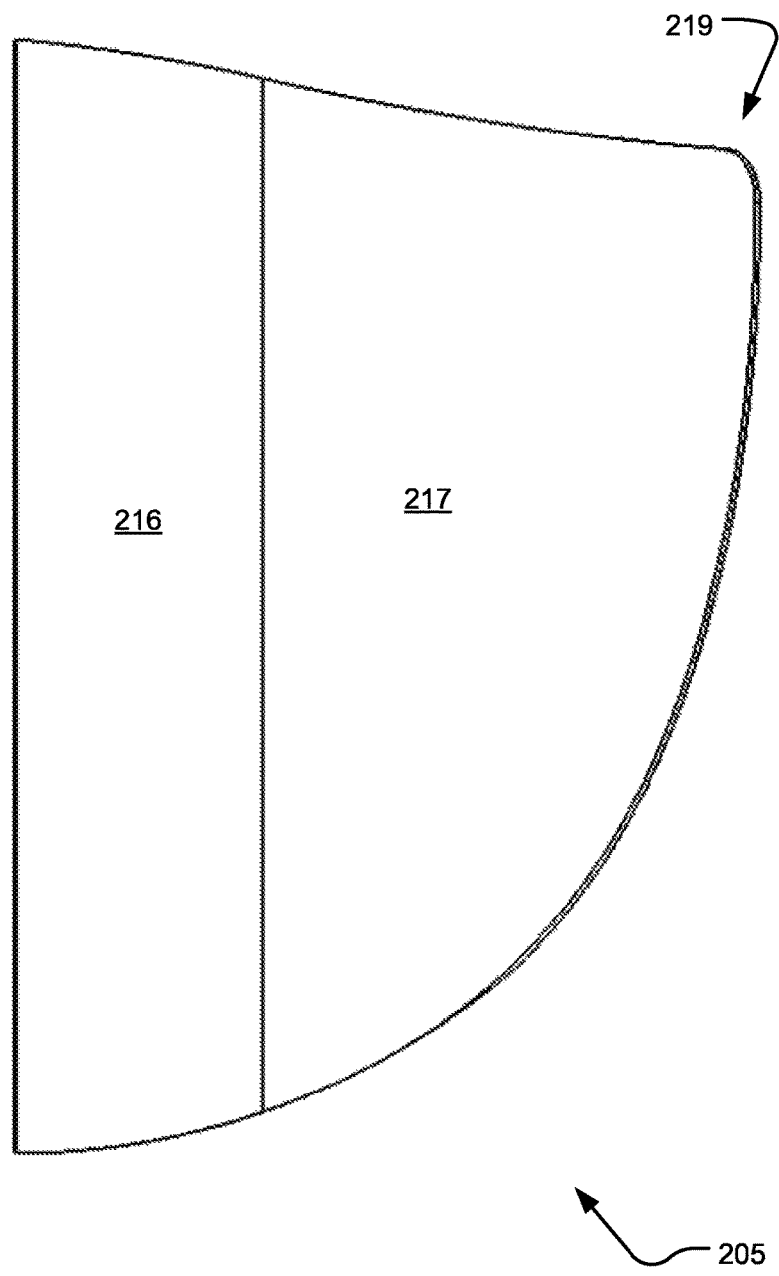
FIG. 12 illustrates a rear elevation view of an exemplary embodiment of a submersible turbine generator blade.

FIG. 12 illustrates a rear elevation view of an exemplary embodiment of a submersible turbine generator blade 205. The diversion scoop 216 is visible here, it comprises the back surface of the leading bull-nose diversion 214. Extending from the diversion scoop 16 is the trailing surface 217 which comprises the back surface of the trailing scoop 215. The blade back surface comprises the diversion scoop 216 and the trailing surface 217. The blade back surface is at least partially cupped so that a flow of material can engage the back surface and act upon it to cause the blade to turn and spin the turbine.

Figure 13:
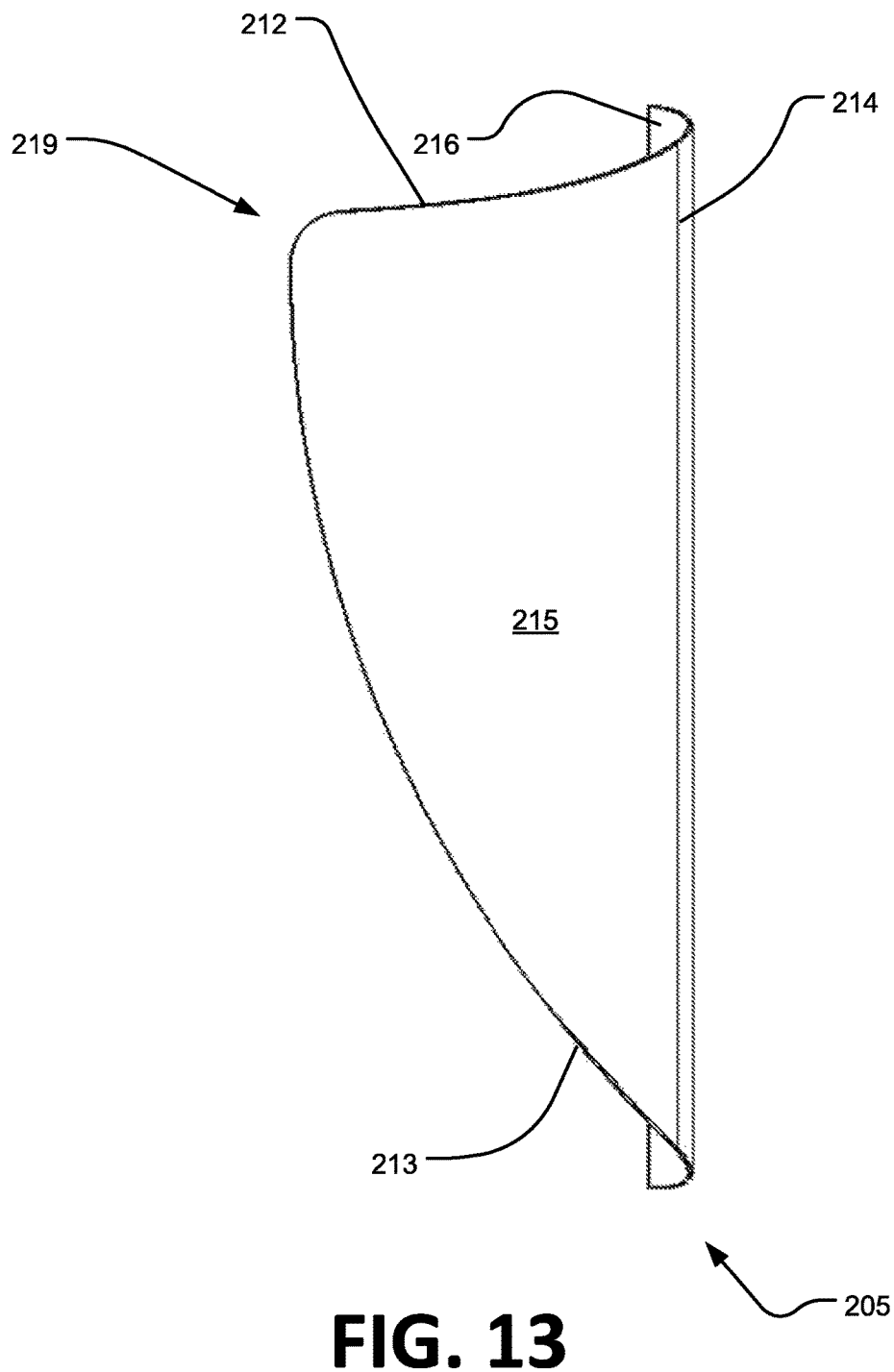
FIG. 13 illustrates a right side elevation view of an exemplary embodiment of a submersible turbine generator blade.

FIG. 13 illustrates a right side elevation view of an exemplary embodiment of a submersible turbine generator blade 10. Here the gradual back-curving shape of the distal portion of the diversion 214 can be clearly seen merging into the swept back curve of the trailing scoop 215.

Figure 14:
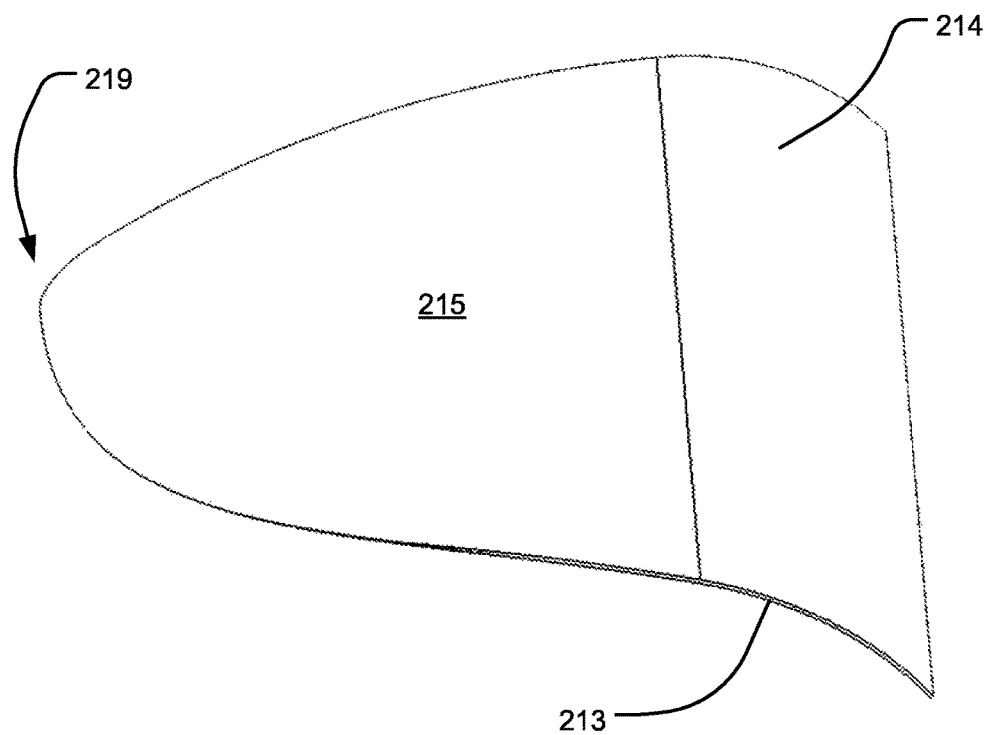
FIG. 14 illustrates a bottom perspective view of an exemplary embodiment of a submersible turbine generator blade.

FIG. 14 illustrates a bottom perspective view of an exemplary embodiment of a submersible turbine generator blade 205. This view complements prior views in making the general shape and curves of the blade more apparent.

While particular embodiments have been described and disclosed in the present application, it is clear that any number of permutations, modifications, or embodiments may be made without departing from the spirit and the scope of this disclosure.

Particular terminology used when describing certain features or aspects of the embodiments should not be taken to imply that the terminology is being redefined herein to be restricted to any specific characteristics, features, or aspects with which that terminology is associated. In general, the terms used in the following claims should not be construed to be limited to the specific embodiments disclosed in the specification, unless the above Detailed Description section explicitly defines such terms. Accordingly, the actual scope of the claims encompasses not only the disclosed embodiments, but also all equivalent ways of practicing or implementing the claimed subject matter.

The above detailed description of the embodiments is not intended to be exhaustive or to limit the disclosure to the precise embodiment or form disclosed herein or to the particular fields of usage mentioned above. While specific embodiments and examples are described above for illustrative purposes, various equivalent modifications are possible within the scope of the disclosure, as those skilled in the relevant art will recognize. Also, the teachings of the embodiments provided herein can be applied to other systems, not necessarily the system described above. The elements and acts of the various embodiments described above can be combined to provide further embodiments.

Any patents, applications and other references that may be listed in accompanying or subsequent filing papers, are incorporated herein by reference. Aspects of embodiments can be modified, if necessary, to employ the systems, functions, and concepts of the various references to provide yet further embodiments.

In light of the above "Detailed Description," the Inventor may make changes to the disclosure. While the detailed description outlines possible embodiments and discloses the best mode contemplated, no matter how detailed the above appears in text, embodiments may be practiced in a myriad of ways. Thus, implementation details may vary considerably while still being encompassed by the spirit of the embodiments as disclosed by the inventor. As discussed herein, specific terminology used when describing certain features or aspects should not be taken to imply that the terminology is being redefined herein to be restricted to any specific characteristics, features, or aspects of the embodiments with which that terminology is associated.

While certain aspects are presented below in certain claim forms, the inventor contemplates the various aspects in any number of claim forms. Accordingly, the inventor reserves the right to add additional claims after filing the application to pursue such additional claim forms for other aspects.

The above specification, examples and data provide a description of the structure and use of exemplary implementations of the described systems, articles of manufacture and methods. It is important to note that many implementations can be made without departing from the spirit and scope of the invention.

What is claimed is:

1. A submersible turbine generator unit, comprising:
a debris guard base having an input port end and extending longitudinally to an output port end;
the debris guard base having an upper surface and a lower surface;
the debris guard base having a bank side and a stream side;
a turbine positioned between the input port end and the output port end of the debris guard base, the turbine configured to have a circular outside perimeter and the turbine comprising a plurality of turbine blades;
an up flow diversion wall attached to, and extending upwards from, the input port end of the debris guard base, on the stream side, and configured so as to direct a flow of material towards the turbine;
the up flow diversion wall having an input port first end and extending to a turbine first end;
a turbine flow wall attached to the input port end of the debris guard base, on the bank side, the turbine flow wall configured to ensure the flow is properly directed to the turbine;
the turbine flow wall having an input port second end and extending to a turbine second end;
the debris guard base, up flow diversion wall, and turbine flow wall together forming a channel that is configured to direct the flow to the turbine;
wherein the channel reduces in cross-section between the input port second end and the turbine second end;
a first flow regulator wall attached to the turbine first end of the up flow diversion wall and configured to provide fine control and direction of the flow as the flow meets the turbine;
a down flow diversion wall extending from the turbine first end of the up flow diversion wall towards the output port end of the debris guard base on the stream side and configured to ensure the flow acts upon the turbine and causes the turbine to spin;
a second flow regulator wall attached to the turbine second end of the turbine flow wall and configured to provide fine control of the flow to the turbine;
a turbine containment wall surrounding at least a portion of the turbine on the bank side and placed in close proximity to the outside perimeter of the turbine;
the turbine containment wall configured so that the turbine is positioned between the turbine containment wall and the down flow diversion wall;

a structural wall on the bank side of the debris guard base and placed so as to at least partially surround the turbine containment wall and form a gap therebetween;

a turbine repositioning system positioned within the gap and configured to raise and lower a drop bar;

the drop bar extending generally vertically and having a cross bar attached near a top of the drop bar, the cross bar extending towards the stream side and beyond the turbine containment wall;

a suspension member extending at least downwards from the cross bar and the suspension member being attached to an electricity generator;

the turbine being attached to the generator and configured such that the spin of the turbine causes the generator to operate and produce electricity;

a third flow regulator wall attached to the turbine containment wall and extending towards the output port end of the debris guard base;

a down flow turbine wall attached to the third flow regulator wall and extending towards the output port end of the debris guard base; and a power transfer cable configure to output the electricity generated by the generator.

2. The submersible turbine generator unit of claim 1 further comprising a plurality of stand off posts attached to the lower surface of the debris guard base and configured to engage a bottom surface and help keep the unit from moving once in place.

3. The submersible turbine generator unit of claim 2 wherein the up flow diversion wall is adjustable so that a diversion of the flow can be enhanced and diminished.

4. The submersible turbine generator unit of claim 2 wherein the turbine repositioning system comprises:
a motor;
a connection;
wherein the motor attaches to the connection and causes a worm gear within the connection to spin;
the connection is in contact with a vertical displacement linear bar rack;
the bar rack is attached to the drop bar such that the turning of the worm gear in a direction causes the drop bar to raise and the turning of the worm gear in an opposite direction causes the drop bar to lower;
raising the drop bar causes the turbine to be raised; and
lowering the drop bar causes the turbine to be lowered.

5. The submersible turbine generator unit of claim 1 wherein the up flow diversion wall is adjustable so that a diversion of the flow can be enhanced and diminished.

6. The submersible turbine generator unit of claim 5 wherein the turbine repositioning system comprises:
a motor;
a connection;
wherein the motor attaches to the connection and causes a worm gear within the connection to spin;
the connection is in contact with a vertical displacement linear bar rack;
the bar rack is attached to the drop bar such that the turning of the worm gear in a direction causes the drop bar to raise and the turning of the worm gear in an opposite direction causes the drop bar to lower;
raising the drop bar causes the turbine to be raised; and
lowering the drop bar causes the turbine to be lowered.

7. The submersible turbine generator unit of claim 6 further comprising a first T travel bar attached to the drop bar and placed within a first T track, the first T travel bar and first T track operating in combination to guide the drop bar as the turbine repositioning system causes the drop bar to raise and lower.

8. The submersible turbine generator unit of claim 1 wherein the turbine repositioning system comprises:
a motor;
a connection;
wherein the motor attaches to the connection and causes a worm gear within the connection to spin;
the connection is in contact with a vertical displacement linear bar rack;
the bar rack is attached to the drop bar such that the turning of the worm gear in a direction causes the drop bar to raise and the turning of the worm gear in an opposite direction causes the drop bar to lower;
raising the drop bar causes the turbine to be raised; and
lowering the drop bar causes the turbine to be lowered.

9. The submersible turbine generator unit of claim 1 further comprising a hard connection point attached to the cross bar and configured to provide a location for attachment of a lifting device so the turbine and generator can be lifted from the unit.

10. The submersible turbine generator unit of claim 1 further comprising a first T travel bar attached to the drop bar and placed within a first T track, the first T travel bar and first T track operating in combination to guide the drop bar as the turbine repositioning system causes the drop bar to raise and lower.

11. A submersible turbine generator unit, comprising:
a debris guard base having an input port end and extending longitudinally to an output port end;
the debris guard base having an upper surface and a lower surface;
the debris guard base having a bank side and a stream side;
a turbine positioned between the input port end and the output port end of the debris guard base, the turbine configured to have a circular outside perimeter and the turbine comprising a plurality of turbine blades;
an up flow diversion wall attached to, and extending upwards from, the input port end of the debris guard base, on the stream side, and configured so as to direct a flow of material towards the turbine;
the up flow diversion wall having an input port first end and extending to a turbine first end;
a turbine flow wall attached to the input port end of the debris guard base, on the bank side, the turbine flow wall configured to ensure the flow is properly directed to the turbine;
the turbine flow wall having an input port second end and extending to a turbine second end;
the debris guard base, up flow diversion wall, and turbine flow wall together forming a channel that is configured to direct the flow to the turbine;
wherein the channel reduces in cross-section between the input port second end and the turbine second end;
a first flow regulator wall attached to the turbine first end of the up flow diversion wall and configured to provide fine control and direction of the flow as the flow meets the turbine;
a down flow diversion wall extending from the turbine first end of the up flow diversion wall towards the output port end of the debris guard base on the stream side and configured to ensure the flow acts upon the turbine and causes the turbine to spin;

a second flow regulator wall attached to the turbine second end of the turbine flow wall and configured to provide fine control of the flow to the turbine;
a turbine containment wall surrounding at least a portion of the turbine on the bank side and placed in close proximity to the outside perimeter of the turbine;
the turbine containment wall configured so that the turbine is positioned between the turbine containment wall and the down flow diversion wall;
a structural wall on the bank side of the debris guard base and placed so as to at least partially surround the turbine containment wall and form a gap therebetween;
a turbine repositioning system positioned within the gap and configured to raise and lower a drop bar;
the drop bar extending generally vertically and having a cross bar attached near a top of the drop bar, the cross bar extending towards the stream side and beyond the turbine containment wall;
a suspension member extending at least downwards from the cross bar and the suspension member being attached to an electricity generator;
the turbine being attached to the generator and configured such that the spin of the turbine causes the generator to operate and produce electricity;
a third flow regulator wall attached to the turbine containment wall and extending towards the output port end of the debris guard base;
a down flow turbine wall attached to the third flow regulator wall and extending towards the output port end of the debris guard base;
a power transfer cable configure to output the electricity generated by the generator; and
wherein each of the plurality of turbine blades comprises:
a connection edge configured to attach the submersible turbine generator blade to a turbine axis;
a leading bull-nose diversion having a first front surface and a first back surface, the leading bull-nose diversion extending from the connection edge and forming a large cupped portion that gradually extends forwards of the connection edge before sweeping back away from the connection edge and attaching to a trailing scoop;
the trailing scoop having a second front surface and a second back surface, the trailing scoop extending from the bull-nose diversion and gradually sweeping well back from the connection edge;
a terminating edge forming the top surface of each blade, the terminating edge sweeping downwards from a top of the connection edge to join a wing edge and form a wing tip;
the wing edge forming the bottom surface of each blade, the wing edge flaring upwards to join the terminating edge and form the wing tip; and
a blade back surface comprising the first back surface and the second back surface, the blade back surface being at least partially cupped so that the flow acts upon the blade back surface and causes the blade to turn and spin the turbine.

12. The submersible turbine generator unit of claim 11 further comprising a plurality of stand off posts attached to the lower surface of the debris guard base and configured to engage a bottom surface and help keep the unit from moving once in place.

13. The submersible turbine generator unit of claim 12 wherein the up flow diversion wall is adjustable so that a diversion of the flow can be enhanced and diminished.

14. The submersible turbine generator unit of claim 12 wherein the turbine repositioning system comprises:
a motor;
a connection;
wherein the motor attaches to the connection and causes a worm gear within the connection to spin;
the connection is in contact with a vertical displacement linear bar rack;
the bar rack is attached to the drop bar such that the turning of the worm gear in a direction causes the drop bar to raise and the turning of the worm gear in an opposite direction causes the drop bar to lower;
raising the drop bar causes the turbine to be raised; and
lowering the drop bar causes the turbine to be lowered.

15. The submersible turbine generator unit of claim 11 wherein the up flow diversion wall is adjustable so that a diversion of the flow can be enhanced and diminished.

16. The submersible turbine generator unit of claim 15 wherein the turbine repositioning system comprises:
a motor;
a connection;
wherein the motor attaches to the connection and causes a worm gear within the connection to spin;
the connection is in contact with a vertical displacement linear bar rack;
the bar rack is attached to the drop bar such that the turning of the worm gear in a direction causes the drop bar to raise and the turning of the worm gear in an opposite direction causes the drop bar to lower;
raising the drop bar causes the turbine to be raised; and
lowering the drop bar causes the turbine to be lowered.

17. The submersible turbine generator unit of claim 6 further comprising a first T travel bar attached to the drop bar and placed within a first T track, the first T travel bar and first T track operating in combination to guide the drop bar as the turbine repositioning system causes the drop bar to raise and lower.

18. The submersible turbine generator unit of claim 11 wherein the turbine repositioning system comprises:
a motor;
a connection;
wherein the motor attaches to the connection and causes a worm gear within the connection to spin;
the connection is in contact with a vertical displacement linear bar rack;
the bar rack is attached to the drop bar such that the turning of the worm gear in a direction causes the drop bar to raise and the turning of the worm gear in an opposite direction causes the drop bar to lower;
raising the drop bar causes the turbine to be raised; and
lowering the drop bar causes the turbine to be lowered.

19. The submersible turbine generator unit of claim 11 further comprising a hard connection point attached to the cross bar and configured to provide a location for attachment of a lifting device so the turbine and generator can be lifted from the unit.

20. The submersible turbine generator unit of claim 11 further comprising a first T travel bar attached to the drop bar and placed within a first T track, the first T travel bar and first T track operating in combination to guide the drop bar as the turbine repositioning system causes the drop bar to raise and lower.

* * * * *